(12) United States Patent
Qian et al.

(10) Patent No.: US 7,693,526 B2
(45) Date of Patent: Apr. 6, 2010

(54) ENHANCED LOAD BASED WIRELESS CALL ADMISSION CONTROL

(75) Inventors: Lu Qian, Solon, OH (US); David S. Stephenson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 825 days.

(21) Appl. No.: 11/505,785

(22) Filed: Aug. 16, 2006

(65) Prior Publication Data
US 2008/0045230 A1 Feb. 21, 2008

(51) Int. Cl.
*H04W 72/00* (2009.01)
*H04L 12/40* (2006.01)

(52) U.S. Cl. .................... 455/452.1; 370/440

(58) Field of Classification Search .......... 455/452.1, 455/435.1, 436, 450, 405; 370/231, 332, 370/395.21, 235, 236, 252, 310, 338, 341, 370/348, 392, 401, 404, 411, 412, 429, 440, 370/333
See application file for complete search history.

(56) References Cited

U.S. PATENT DOCUMENTS

| 5,884,174 | A | 3/1999 | Nagarajan et al. |
| 6,459,681 | B1 | 10/2002 | Oliva |
| 7,006,472 | B1 * | 2/2006 | Immonen et al. ............ 370/332 |
| 2003/0214928 | A1 * | 11/2003 | Chuah ........................ 370/336 |
| 2005/0107087 | A1 * | 5/2005 | Makinen et al. ............. 455/450 |
| 2006/0171314 | A1 | 8/2006 | Qian |

* cited by examiner

*Primary Examiner*—Melody Mehrpour
(74) *Attorney, Agent, or Firm*—Baker Botts L.L.P.

(57) ABSTRACT

In one embodiment, a method includes monitoring utilization of an access medium relative to one or more access classes, receiving a QoS request. The QoS request identifies an access class. The method further includes computing a first allocation of an access medium for the QoS request and approving the QoS request if the computed first allocation is less than an amount of the access medium available to the access class identified in the QoS request.

26 Claims, 5 Drawing Sheets

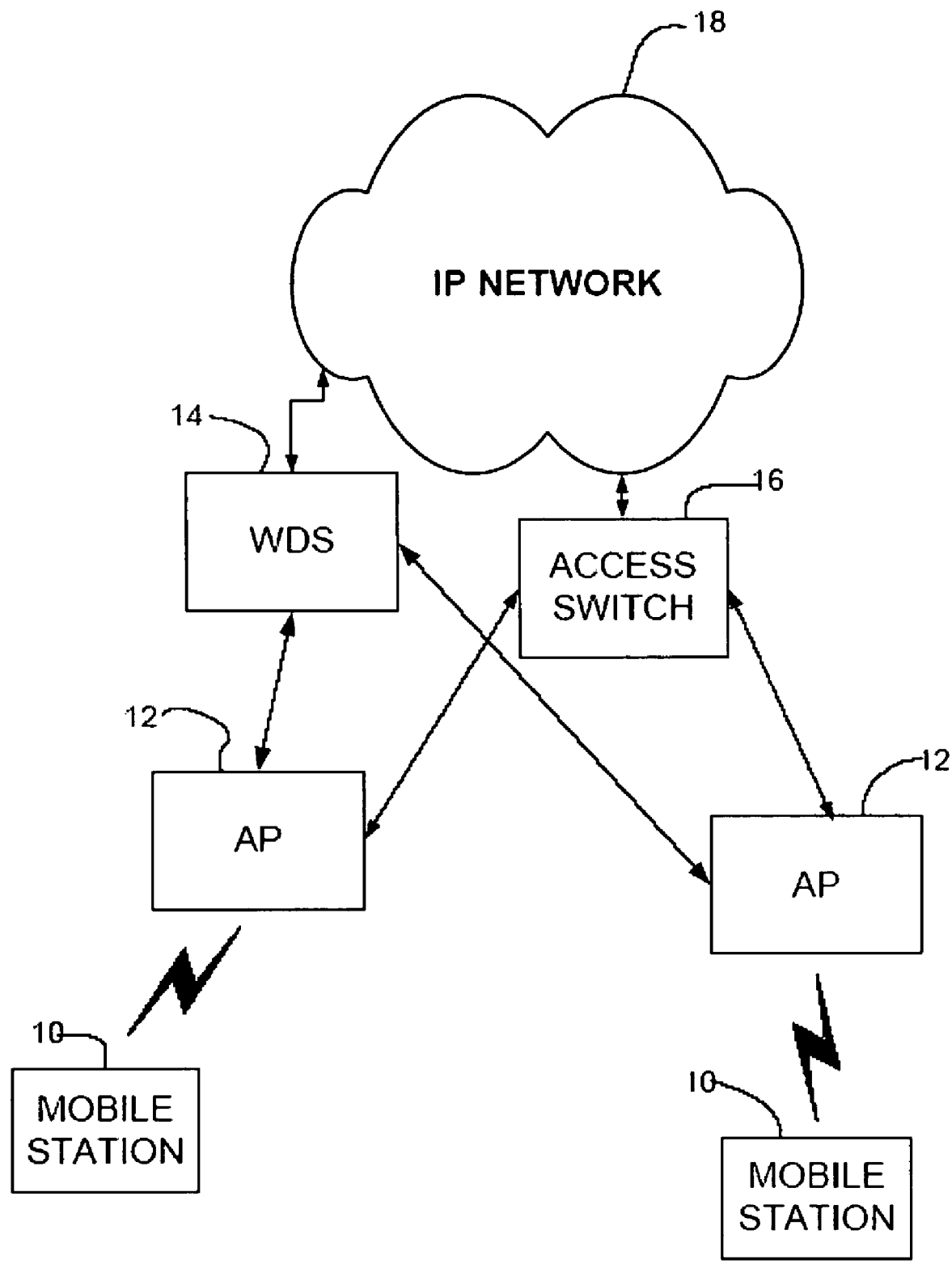
Fig._1

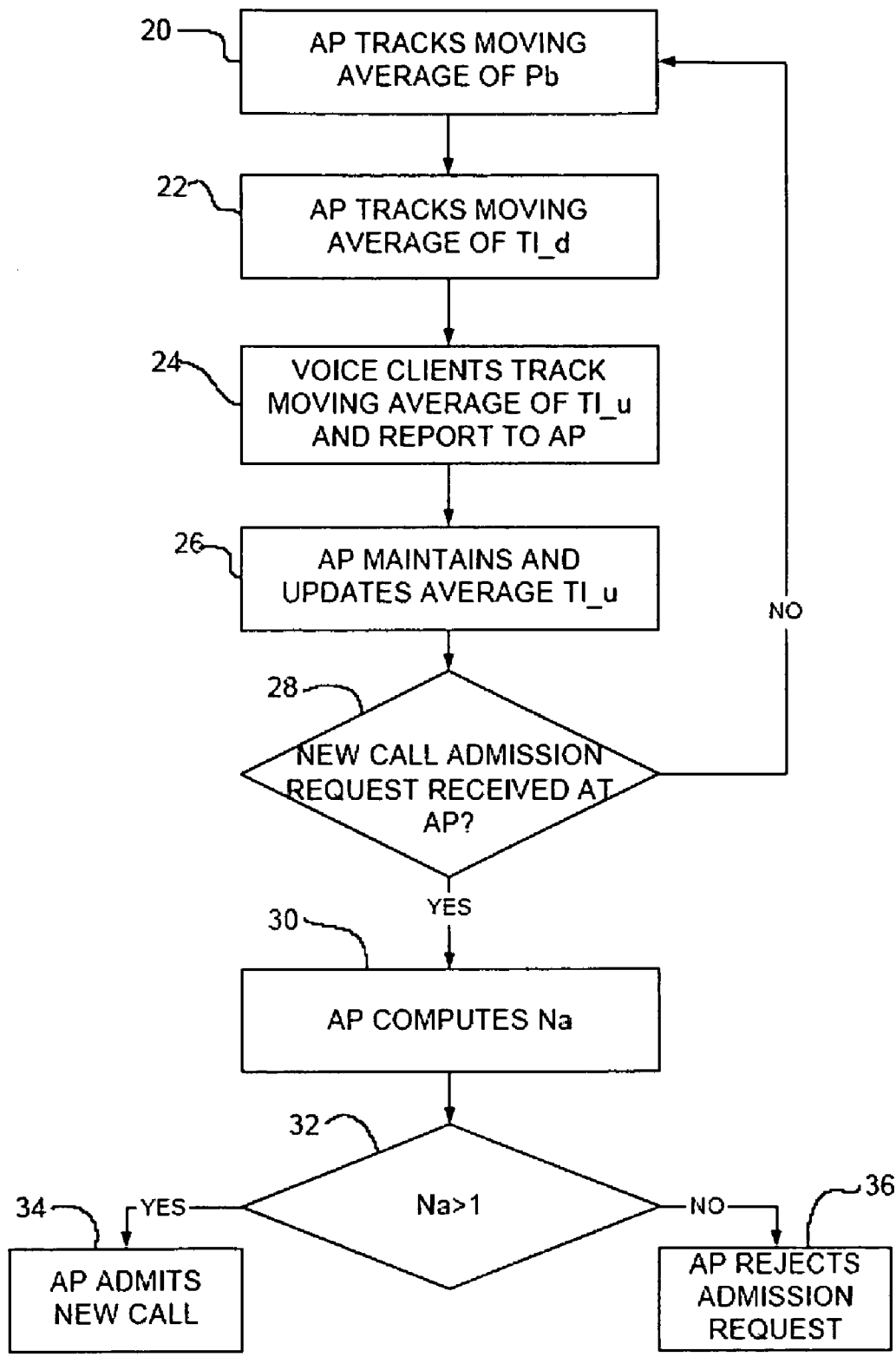
Fig._2

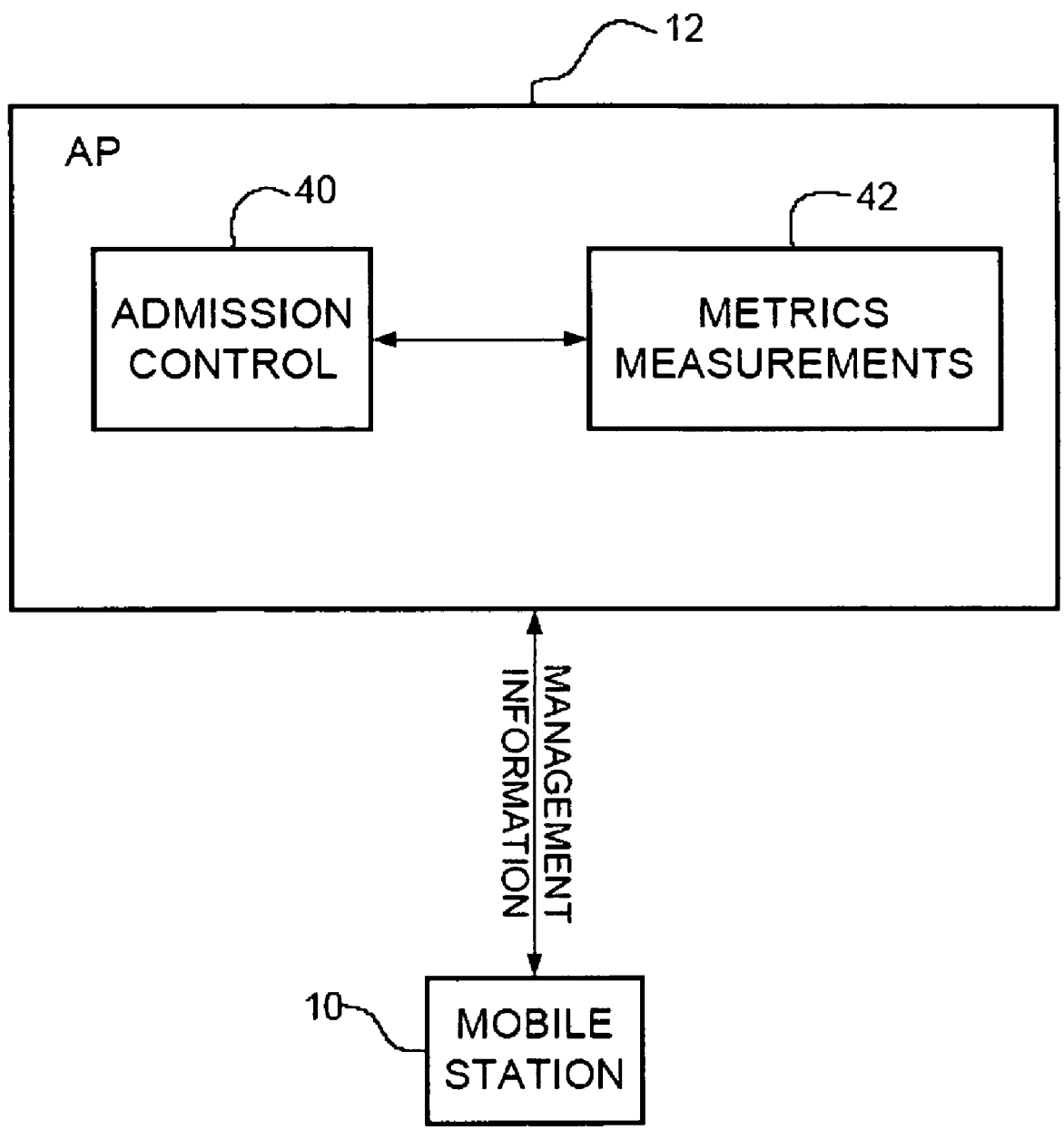
Fig._3

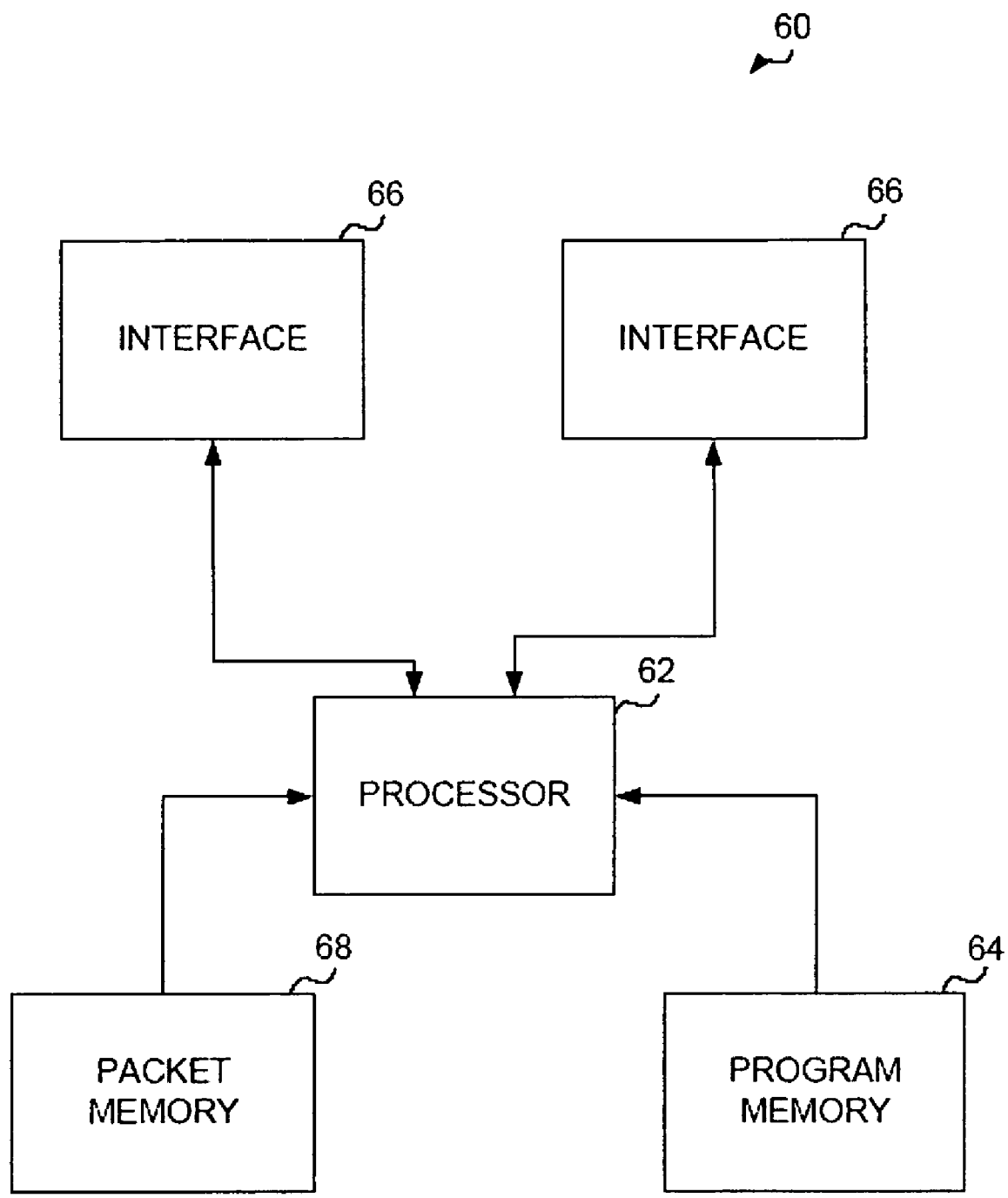
Fig._4

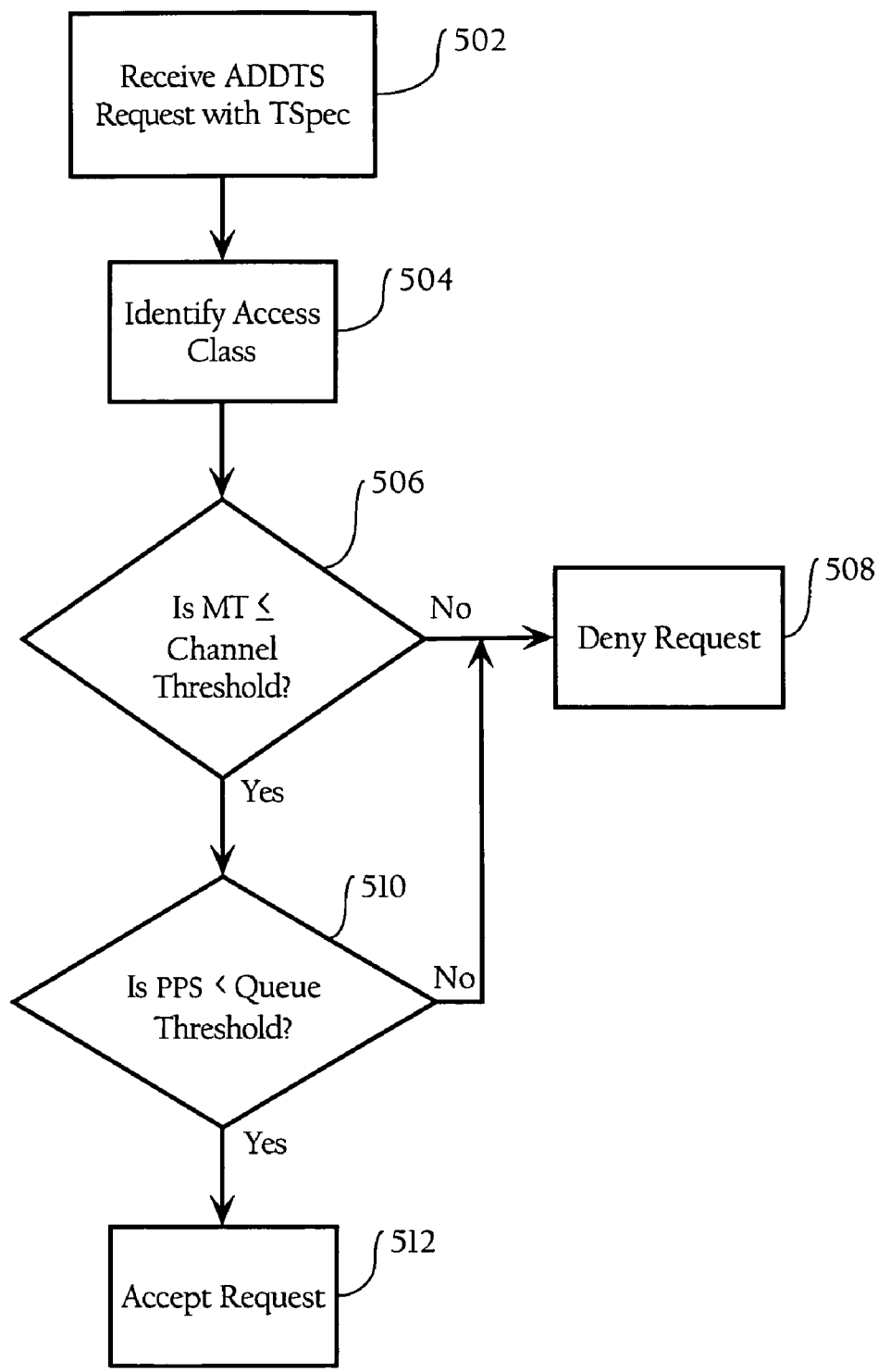
Fig._5

ENHANCED LOAD BASED WIRELESS CALL ADMISSION CONTROL

TECHNICAL FIELD

The present invention relates to wireless networks and, more particularly, to methods, apparatuses, and systems directed to call admission control in a wireless network.

BACKGROUND

In recent years wireless networks have gained popularity and have been widely deployed. With fast deployment of wireless local area networks (WLANs), the ability of WLANs to support real time services while maintaining quality of service (QoS) requirements has become an important issue. In order to support a wide range of traffic on a wireless network, the infrastructure should be capable of supporting various quality of service (QoS) requirements, including call admission. Call admission control (CAC) plays a significant role in providing the desired quality of service in wireless networks. CAC limits the number of call connections into the network in order to reduce network congestion and call dropping. CAC operates to maximize the use of available bandwidth, either in calls accepted or traffic scheduled according to channel utilization, while minimizing a blocking probability for new calls and call drop probability for connected calls. Admission of even one more call than the call capacity can bring the WLAN from stable to unstable, causing a significant degradation of the voice quality of admitted calls. CAC should therefore be in place to ensure the quality of service. Many CAC schemes use metrics such as delay, jitter, and packet loss rate. However, these metrics do not provide an optimal call admission decision. Furthermore, CAC schemes often make the implementation complex and lead to performance degradation.

DESCRIPTION OF THE DRAWINGS

FIG. 1 illustrates an example wireless communication system.

FIG. 2 illustrates an example method for evaluating the number of additional admissible calls for use in call admission control.

FIG. 3 illustrates example components of an access point of the wireless communication system of FIG. 1.

FIG. 4 illustrates an example network device.

FIG. 5 illustrates an example method for call admission control.

DESCRIPTION OF EXAMPLE EMBODIMENTS

A. Overview

Particular embodiments of the present invention are directed to call admission control in a wireless network. According to one embodiment of the present invention, the wireless network infrastructure evaluates the number of additional admissible calls for use in call admission control, where the wireless network infrastructure tracks a percentage of channel busy time and transmission time of downlink and uplink voice packets, receives a call admission request, and calculates the number of admissible calls.

In another embodiment, the wireless network infrastructure determines whether a call admission request for a new call or for a roaming call should be admitted based on the medium time, the packet rate, or a combination thereof. In one implementation, the wireless network infrastructure determines if the medium time is less than or equal to a channel threshold. In one implementation, the channel threshold is based in part on the access class of the mobile station. If the medium time is greater than the channel threshold, the wireless network infrastructure denies the request. In one implementation, if the medium time is less than or equal to the channel threshold, the wireless network infrastructure determines if the packet rate is less than a queue threshold. In one implementation, the queue threshold is based in part on the access class of the mobile station. If the packet rate is not less than the queue threshold, the wireless network infrastructure denies the request. If the medium time is less than the queue threshold, the wireless network infrastructure accepts the request.

B. Evaluating the Number of Additional Admissible Calls

A method for evaluating the number of additional admissible calls for use in call admission control generally comprises tracking a percentage of channel busy time and transmission time of downlink and uplink voice packets, receiving a call admission request, and calculating the number of admissible calls. The number of admissible calls is calculated based on a channel bandwidth requirement determined from the percentage of channel busy time and a voice packet queuing requirement determined from the transmission time of downlink and uplink voice packets. The call admission request is approved if the number of admissible calls is greater than one and rejected if the number of admissible calls is less than one.

A system for evaluating number of additional admissible calls for use in call admission control generally comprises a metrics measurement module and an admission control module. The metrics measurement module is operable to track a percentage of channel busy time and transmission time of downlink and uplink voice packets. The admission control module is operable to receive a call admission request, calculate the number of admissible calls based on a channel bandwidth requirement determined from the percentage of channel busy time, and a voice packet queuing requirement determined from the transmission time of downlink and uplink voice packets, and approve the call admission request if the number of admissible calls is greater than one and reject the call admission request if the number of admissible calls is less than one.

A method and system for evaluating the number of additional admissible calls for use in call admission control (CAC) are disclosed herein. The number of additional admissible calls is based on network requirements for WVoIP. By keeping track of the percentage of channel busy time and the transmission time of downlink and uplink voice packets, an AP (access point) is able to efficiently evaluate the number of additional admissible calls so as to safely make a real-time CAC decision without running the risk of adversely affecting the admitted calls. The method and system may be applied extensively to WVoIP in both large enterprise environments and small or medium business environments.

C. Example Wireless Network System Architecture

FIG. 1 illustrates an example wireless communication system. The wireless communication system facilitates two-way communication between a plurality of subscriber units (fixed and portable mobile stations) 10 and a fixed network infrastructure 18. Mobile stations 10 may be cellular telephones, personal communication systems such as personal digital assistants (PDAs), laptop computers, pagers, or other suitable wireless devices providing voice, video, data, and other wireless services to users. As shown in FIG. 1, the network includes one or more access points (APs) 12, one or more wireless domain services (WDSs) 14, one or more access switches (AS) 16, and multiple subscriber units (mobile stations) 10. The mobile stations 10 are in communication with the APs 12 and may also be in communication with one or more satellites to enable communication with one or more devices coupled to the IP network 18 or any other network. The mobile station 10 may also communicate directly with other devices, such as other mobile stations using suitable wireless communication techniques. Each access point 12 is in communication with WDS 14 and access switch 16. Multiple access points 12 may report to one WDS 14. The access points 12 are coupled to the IP network 18 and allow mobile stations 10 to communicate with other devices coupled to the WLAN. The WLAN may include, for example, access routers, core routers, and other network elements, as is well known by those skilled in the art. The network may include any number of subnetworks and routers, and the subnetworks can form a network topology other than LAN, such as a wide area network, an enterprise network, and a metropolitan area network, for example.

It is to be understood that the network shown and described herein is only one example and that the present invention may be implemented in any telecommunication network utilizing call admission control policies. For example, the method and system described herein may be used with packet data other than IEEE standard 802.11.

In order to provide sufficient quality of service for voice packets, a certain amount of voice bandwidth may be serviced or admitted by the AP 12. If the amount of voice traffic is increased beyond this limit, the QoS of all calls would suffer. The method and system described herein utilize a CAC quality metric for QoS traffic that provides information sufficient to make call admission control decisions. These metrics are preferably made available to the access points 12 in relatively frequent intervals (e.g., 5 second intervals).

The call admission control function allocates bandwidth to client devices on a first-come, first-serve basis, and may also be used to maintain a small reserve so mobile phone clients can roam into a BSS (basic service set) (even though the BSS would otherwise be at full capacity). The CAC metrics may also be used to reserve a specified amount of bandwidth for voice or data. For example, fifty percent of a channel capacity may be reserved for voice and fifty percent reserved for data. The system may also be configured to set a priority to voice or data or used in real time video conferencing to prioritize critical data. The CAC metrics may also be used for load balancing at the WDS based on data received from the APs. A user interface (UI) may be provided to configure channel reservation for roaming or load balancing. The user interface may also display the number of admitted calls, number of additional admissible calls, or other metrics.

The metrics set forth below for use in making a CAC decision are dynamic since the call capacity for a network varies with the network conditions and configurations. The CAC metrics are configured to adjust to changes in wireless medium conditions and network traffic conditions and account for local channel conditions such as foreign interference (e.g., from microwave radios, Bluetooth radios, etc.) that may only affect one or two APs 12 and not the entire WLAN. The CAC metrics described herein are used to predict the impact of a new call on the WLAN before the system admits the call to reduce the chances of a new call causing the WLAN to become unstable.

In one implementation, the CAC metric is based on two requirements (conditions) for a stable WLAN involving the presence of voice clients; channel bandwidth and voice packet queuing, as described in detail below.

The channel bandwidth requirement ensures that there is enough channel bandwidth for voice packets. If a number (N) of calls have already been admitted in a basic service set (BSS), the available network bandwidth for additional admissible calls within a voice packet time interval (dT) is represented by:

$$dT*(1-Pb);$$

where:

dT: voice packet interval; and
   Pb: % of channel busy time from an AP's perspective.

The voice packet interval dT is determined by a Codec in the voice clients and may be, for example, 20 ms. Pb is the percentage of time that the receiver is busy demodulating IEEE standard 802.11 traffic and includes the time the AP 12 transmits packets and the time the AP's clear channel assessment (CCA) reports that a channel is busy. If the WLAN can accommodate a number of additional calls (Na), the additional calls will take a network bandwidth of:

$$(Tl\_u+Tl\_d)*Na; \text{ and}$$

$$(Tl\_u+Tl\_d)*Na \leq dT*(1-Pb)$$

where:

Na: number of additional admissible calls;
   Tl_u: average transmission time for voice packets in an uplink;
   Tl_d: average transmission time for voice packets in a downlink; and
   Pb: % of channel busy time from an AP's perspective.

Tl_u and Tl_d are the transmission time for voice packets starting when they reach the front end of their transmission queues to the time they receive an acknowledgement for the uplink and downlink respectively, measured and averaged over a sliding time window. Tl_d is measured by the AP itself and Tl_u is measured and reported to the AP by each voice client. The AP further averages Tl_u over the number of voice clients. The retransmission of packets and the time in back-off are counted in the transmission time. When N=0, a predefined value may be used to estimate Tl_u and Tl_d since there are no AP or client measurements of Tl_d and Tl_u respectively as measurements are only made where a voice call is present.

The Na equations set forth above can be represented as:

$$Na \leq Na1;$$

where:

$$Na1=dT*(1-Pb)/(Tl\_u+Tl\_d).$$

The following describes the voice packet queuing requirement. The rate that voice packets leave a transmission queue of a network node should be no slower than the arrival rate of voice packets. Otherwise the transmission queue for voice packets in a network node will be overloaded. For the AP, this requirement can be written as:

$$(N+Na)*Tl\_d \leq dT$$

or $$Na \leq Na2;$$

where:

$$Na2=dT/Tl\_d-N.$$

A new CAC metric for use in defining the number of additional calls that can be supported is therefore defined as:

$$Na = \min(Na1, Na2);$$

where:

$$Na1 = dT*(1-Pb)/(Tl\_u + Tl\_d);$$

$$Na2 = dT/Tl\_d - N.$$

If Na>1, then a new call can be admitted.

The CAC metric Na is determined by real-time measurable metrics and is therefore very accurate. Since Na is self-adaptive, it can dynamically adjust to changes in network conditions. For example, when the data traffic increases, the number of allowed calls can be lowered automatically. Na also includes other network factors, such as traffic load, channel conditions, and multi-cell interference.

D. Example Process for Use in Call Admission Control

FIG. 2 illustrates an example method for evaluating the number of additional admissible calls for use in call admission control. At step 20, the AP keeps track of a moving average of Pb over a sliding time window. As described above, Pb is derived from the time the AP is in transmission and the time the AP's CCA reports busy. The AP also keeps track of a moving average of Tl_d over a sliding time window (step 22). Each voice client keeps track of a moving average of its Tl_u over a sliding time window and reports Tl_u to the AP periodically (step 24). The AP maintains an average of Tl_u over the number of received Tl_u's within a sliding time window (step 26). Upon receiving a Tl_u from a voice client, the AP adjusts the average Tl_u it maintains accordingly. When the AP gets a new call admission request, it computes Na1, Na2 and Na from N, Pb, Tl_u and Tl_d by using the above formulas (steps 28 and 30). If Na is greater than 1, the AP can safely admit the new call (steps 32 and 34). If Na is less than or equal to 1, the AP rejects the admission request (steps 32 and 36).

It is to be understood that the process described above is only one example, and that the process may be modified without departing from the scope of the invention. For example, the method can easily be extended so that some call slots are reserved for roaming calls. The process may also be applied to admission control for other QoS applications such as video streams. Also, other co-channel APs can exchange information so that the total N (number of calls on the channel) is accounted for in the formula for Na2. In another embodiment, other co-channel APs can exchange information so that only Pb due to voice calls (and not best-effort data packets) is measured, thereby providing a more accurate estimate of Na. This may be important since EDCA will, to a large extent, prioritize voice and video packets ahead of data packets. Also, the process may be extended to use different voice packet intervals other than 20 ms or even a mixture of intervals within a BSS.

E. Example Admission Control Module

FIG. 3 illustrates example components of an access point of the wireless communication system of FIG. 1. In one implementation, a metrics measurement module 42 posts the latest measurement of metrics such as Tl_u, Tl_d, Pb, etc. (described above). The admission control module 40 computes Na from these values. In one implementation, the metrics measurement module 42 also posts the latest measurement of metrics such as Pb, Av, RRv, Qo, No, Nn, etc. (described below). Information from the mobile stations 10 is transferred to the AP 12 as management information. The admission control and metrics measurement modules 40, 42 are 20 shown in FIG. 2 as part of the AP 12. It is to be understood, however, that the admission control module 40 may also be located within the WDS 14. In this case, requests for voice metrics are sent to the APs 12 over the WDS 14. As the APs 12 receive the request for voice measurements, they respond to the WDS 14 with requested data.

The AP 12 (or WDS 14) collects the data and dynamically performs the calculations to determine the CAC metrics. If the AP 12 determines that the number of calls has reached its limit based on the CAC metrics, it rejects new requests and may direct the requests to other APs 12. The admission control module 40 may respond to a request with a bandwidth confirm message permitting a call to be placed or a bandwidth reject message refusing to make the necessary connection for the call.

The admission control module 40 may be a controller having a processor configured to execute software stored in memory and receive input from interfaces for use in executing the software, as described below with respect to FIG. 4, for example. FIG. 4 illustrates an example network device. In one embodiment, network device 60 is a programmable machine that may be implemented in hardware, software, or any combination thereof. A processor 62 executes code stored in a program memory 64. Program memory 64 is one example of a computer-readable medium. Program memory 64 can be a volatile memory. Another form of computer-readable medium storing the same codes is a type of non-volatile storage such as floppy disks, CD-ROMs, DVD-ROMs, hard disks, flash memory, etc. A carrier wave that carries the code across a network is another example of a computer-readable medium. Network device 60 may interface with transmission media via a plurality of interfaces 66. To implement functionality according to the present invention, interfaces 66 may incorporate processing and memory resources similar to those discussed above in connection with the network device as a whole. As packets are received, processed, and forwarded by network device 60, they may be stored in a packet memory 68. Network device 60 shown in FIG. 4 is only one example of a computer system suitable for use with the invention. Other devices and systems having different configurations of subsystems may also be utilized.

As can be observed from the foregoing, the system and method described herein have many advantages. For example, the number of admissible calls (Na) is determined by real-time measurable metrics of the network, so it is very precise for the real time network conditions. Na is also self-adaptive and, therefore, can dynamically adjust to changes in network conditions. For example, when the data traffic decreases, the number of allowed calls can be increased automatically. Furthermore, Na automatically includes other network factors, such as traffic loads, channel conditions, and multi-cell interference via the percentage of channel business and retransmissions and back-off counted in transmission time. It also accounts for local channel conditions including foreign interference that may only affect one or more APs and not the entire WLAN. Since Na is a function of N, Na has a good predictability demanded by any reliable CAC procedure.

While the implementations described above involve both uplink and downlink measurements, the implementations described below may operate without the uplink measurements. Furthermore, the implementations described below also contemplate the coexistence of voice clients with various codecs and accommodate voice channel reservation and roaming reservation.

F. Example Enhanced Process for Use in Call Admission Control

The following description describes implementations where the wireless network infrastructure determines whether a call admission request for a new call or for a roaming call should be admitted based on the medium time, the packet rate, or a combination thereof. In the implementation described below, the call admission decisions are based on metrics observed by access points, obviating the need for metrics observed by mobile stations. The call admission control functions discussed below also account for voice channel reservations and roaming-in reservations which a network administrator may have configured. The wireless communication network of FIG. 1, the admission control module 40 and metrics measurements module 42 of FIG. 3, and the network device 60 of FIG. 4, described above, may be used to implement the embodiments described below.

FIG. 5 illustrates an example method for call admission control. As FIG. 5 shows, an AP 12 receives a call admission request (or re-association request) from a mobile station 10 (502). Next, AP 12 identifies the access class of mobile station 10 (504). Next, AP 12 determines if the medium time is less than or equal to a channel threshold (506). The comparison of the medium time to the channel threshold is described in more detail below in Section F.1. If the medium time is greater than the channel threshold, AP 12 denies the request (508). If the medium time is less than or equal to the channel threshold, AP 12 determines if the packet rate is less than a queue threshold (510). The comparison of the packet rate to the queue threshold is described in more detail below in Section F.2. If the packet rate is not less than the queue threshold, AP 12 denies the request (508). If the packet rate is less than the queue threshold, AP 12 accepts the request (512).

F.1. Comparison of the Medium Time to the Channel Threshold

In one implementation, the medium time (MT) is a value that represents a portion of the available medium that the admission control module 40 will allocate to a mobile station 10 for transmission. In one implementation, MT is based on the QoS parameters requested by a mobile station. In one implementation, MT may be expressed in a number of uniform time intervals within a given period in which admission control module 40 will allow mobile station 10 to use the medium. For example, in one implementation, the uniform time interval may be 32 µs and the time period may be one-second. Accordingly, if admission control module 40 provides mobile station 10 with an MT of 1000, mobile station 10 will have permission to use the medium for 1000 32 µs increments per 1-second period.

Admission control module 40 computes MT for a new call admission request, which, in one implementation, may be a non-roaming in call or a roaming in call. In one implementation, the call admission request may be an ADDTS request. According to the 802.11e specification, the ADDTS request is a management frame that includes a TSpec information element (TSpec IE) that can be used to specify a requested set of QoS attributes, such as data rate, packet size, packetization interval, and priority. In one implementation, the stream for which QoS is requested is identified by a Traffic Stream Identifier (TSID) contained in the TSpec IE. In one implementation, mobile station 10 provides TSpec parameters via the TSpec IE to admission control module 40, which in turn computes MT based at least in part on the parameters.

In one implementation, AP 12 compares the MT to the channel threshold according to the following expression:

$MT \leq \min(1-Pb, Av-RRv-Pv)$.

The expression 1−Pb is the percentage idle time of the medium, where Pb is the percentage of time that the medium is busy (e.g., busy demodulating IEEE standard 802.11 traffic) and includes the time during which the AP 12 transmits packets and the time during which the clear channel assessment (CCA) report of AP 12 indicates that the channel is busy, such as during the time when the RSSI is greater than CCA. In one implementation, an optimization may be to add DIFS and CWmin/2 for packets transmitted by AP 12.

Av is the percentage of the medium/channel allocated for voice calls. In one implementation, Av may function as an upper limit, thereby providing sufficient bandwidth for voice channel reserves or other purposes. In one implementation, if excessive interference is present in the WLAN, admission control module 40 may limit the voice capacity to a value lower than Av. In one implementation, a user (e.g., a system administrator) may configure a maximum bandwidth utilization per queue and a roaming reserve per queue. For example, the user may configure admission control module 40 to allocate a portion of the channel bandwidth (e.g., up to 50%) to voice services.

RRv is the percent of channel allocated for roaming reserves for voice calls. In one implementation, AP 12 may derive RRv based on the voice call allocation. Alternatively, in one implementation, the user may manually configure an RRv value. For example, the user may input an RRv value to configure admission control module 40 to allocate a portion of the channel bandwidth (e.g., up to 50%) for roaming reserves for voice. In one implementation, the RRv term is used for non-roaming-in calls. For roaming-in calls, the RRv term is eliminated from the computation above.

Pv is the observed utilization of the channel or medium by admitted voice calls over the last 1-second time period. In one implementation, Pv may be described by the following expression:

$Pv = \Sigma(Tdr) + 1.1 * \Sigma(Tu\_vc)$, where $Tdr = \Sigma(Tvtx + DIFS + slot * CWmin/2 + SIFS + Tack)$, and $Tu\_vc = \Sigma(Tvoice + DIFS + slot * CWmin/2 + SIFS + Tack)$.

Tvtx is the transmission time of voice frames from the AP. Σ is the sum over all voice packets that AP 12 transmits, including retries. The term slot refers to the radio-dependent slot time. Tvoice is the receiving time of voice frames to the AP while the sum is over all voice packets that are correctly demodulated. In one implementation, upstream measurements may include downstream transmissions from other APs. This equation for Tdr accounts for the time corresponding to successful transmissions as well as transmissions whose data frame is successfully demodulated but whose ACK is lost. Tack is the time to transmit an acknowledgement.

In one implementation, all metrics in Pv are computed in one-second intervals. Computing Pv in one-second intervals eliminates any explicit codec dependencies. Eliminating codec dependencies enables multiple codes to coexist, thereby enabling a mixture of codec intervals (e.g., both 20 ms and 30 ms packetization intervals).

As described above, if MT is greater than the channel threshold, AP 12 denies the request (508), and if the medium time is less than or equal to the channel threshold, AP 12 determines if the packet rate is less than a queue threshold (510), as described below.

In one implementation, Pv may involve default or assumed uplink values in terms of actual, measured downlink values, thereby providing a solid approximation based on extensive network simulations that utilize measurements of APs even when measurements of mobile stations may not be available. Accordingly, Pv provides, in one implementation, a precise prediction of channel bandwidth consumption by eliminating potential inaccuracies resulting from any possible overlapping of uplink and downlink transmission delays observed in some situations.

In one implementation, admission control 40 computes MT in the same units that 802.11e and WMM TSpecs use. This is not only convenient but it is also service independent in that it may provide call admission decisions in terms of medium time.

Although the present invention disclosed herein is described in the context of voice packets, the present invention may apply to packets of other access classes (e.g., video packets, etc.), and still remain within the spirit and scope of the present invention.

F.2. Comparison of the Packet Rate to the Queue Threshold

As described in more detail below, the packet rate is compared to a queue utilization threshold to ensure that the number of packets entering the queue is less than the number of packets leaving the queue. In one implementation, AP 12 compares the packet rate to the queue threshold according to the following expression:

$$Qo * \frac{No + Nn}{No} < 1.$$

The current/observed queue output utilization Qo is multiplied by (No+Nn)/No to determine if the estimated queue output utilization is less than 1 second or 100% of the queue capacity. In one implementation, Qo is calculated in packets per second (pps). The above threshold determination is based on a 1 second analysis interval; accordingly, the threshold value of 1 second will change depending on the analysis interval.

The sum of No and Nn is the new aggregate packet rate, or percentage increase, if the current call admission request is granted, where No is the total observed current packet rate (i.e., on-going calls without adding the new stream) and Nn is the estimated packet rate for the current call (i.e., of the new call/stream in question). In one implementation, No and Nn represent downlink voice packets (i.e., packets being transmit down from AP 12 to mobile station 10). Nn may be derived from one or more attributes of the call admission request (such as a codec identifier or a packetization interval), and the observed packet rate over the last one-second interval.

In one implementation, Qo may be described according to the following expression:

$Qo = \Sigma Td + \Sigma Tw$, over the last 1-second interval.

Td is the medium/transmission time corresponding to downlink voice frames, which includes retries and, in one implementation, may be described according to the following expression:

$Td = \Sigma(Tvtx + SIFS + Tack)$, over the last 1-second interval.

Tw is the time that voice packets spend waiting at the front of the queue before transmission begins.

Although the present invention disclosed herein is described in the context of one queue for QoS packets, the present invention may apply to multiple queues and each queue may be dedicated to a different access category (e.g., one for voice, one for video, etc.), and still remain within the spirit and scope of the present invention.

In one implementation, admission control module 40 may adapt the processes described above in order to compute a particular number of additional calls that may be admitted. For example, admission control module 40 may utilize the following expression to compute a particular number of additional calls:

$Na = \min(Na3, Na4)$, where $Na3 = N*\min(1-Pb, Av-RRv-Pv)/Pb\_v$, and where $Na4 = No/Nn*(1/Q0-1)$.

N is the number of calls admitted by AP 12 (which does not include calls admitted by other co-channel APs). Pb_v=(2+3Rd)/(1+Rd)*sum(Td), and Rd is the average retry rate for downlink voice packets.

In one implementation, CAC functions, as discussed above, may independently apply to individual queues (e.g., AC_VO and AC_VI). For example, admission control 40 may allocate separate bandwidth for voice services (using AC_VO) and video conferencing and/or video streaming services (using AC_VI). In one implementation, admission control module 40 may dynamically admit new traffic streams and enforce per-queue bandwidth, thereby providing much flexibility. Furthermore, in one implementation, packetization intervals may be different among queues.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A method comprising:
monitoring utilization of an access medium relative to one or more access classes;
receiving, at an access control point, a Quality of Service (QoS) request, wherein the QoS request identifies an access class;
computing a first allocation of an access medium for the QoS request;
estimating a queue utilization for the QoS request based on the current queue utilization of the access class identified in the QoS request; and
approving the QoS request, if the computed first allocation is less than an amount of the access medium available to the access class identified in the QoS request; wherein approval of the QoS request is further conditioned on the estimated queue utilization not exceeding a queue utilization threshold; and
wherein estimating comprises the queue utilization calculating whether:

$$\frac{Qo * No + Nn}{No} < AI,$$

wherein:
AI is an analysis interval time:
Qo is a current observed queue output utilization;
No is a total observed current packet rate; and
Nn is an estimated packet rate.

2. The method of claim 1 wherein the available amount of the access medium is based on one or more of an access category reservation, a roaming-in reservation and the observed utilization of the access medium corresponding to the access class identified in the QoS request.

3. The method of claim 1 wherein the monitoring step comprises tracking, relative to an access point, a percentage of channel busy time and transmission time of downlink frames.

4. The method of claim 1 wherein the first allocation comprises a number of time slots within a repeating, uniform time interval.

5. The method of claim 1 wherein estimating the queue utilization for the QoS request is based at least in part on the packet rate of the codec corresponding to the QoS request.

6. The method of claim 5 wherein the packet rate varies with the corresponding codec identified in the QoS request.

7. The method of claim 1 further comprising identifying, from a plurality of queues, a queue corresponding to the access class identified in the QoS request, and wherein the estimated queue utilization corresponds to the identified queue.

8. The method of claim 1 wherein the amount of the access medium available to the access class is a configurable parameter.

9. The method of claim 1 wherein approvals of QoS requests apply independently to individual queues, and wherein each queue can be dedicated to a different access class.

10. The method of claim 1 wherein access classes comprise one or more of video and voice.

11. A method comprising:
monitoring utilization of an access medium relative to one or more access classes;
receiving, at an access control point, a Quality of Service (QoS) request, wherein the QoS request identifies an access class;
computing a first allocation of an access medium for the QoS request; and
approving the QoS request, if the computed first allocation is less than an amount of the access medium available to the access class identified in the QoS request, wherein the approving QoS request comprises calculating whether:

$$MT <= \min(1 - Pb, Av - RRv - Pv),$$

wherein:
MT is the first allocation of the access medium;
Pb is a percentage of time that the access medium is busy;
Av is a percentage of the access medium for voice calls;
RRv is a percent of the access medium allocated for roaming reserves for voice calls; and
Pv is an observed utilization of the access medium by voice calls.

12. The method of claim 11 further comprising estimating a queue utilization for the QoS request based on the current queue utilization of the access class identified in the QoS request; wherein approval of the QoS request is further conditioned on the estimated queue utilization not exceeding a queue utilization threshold; and wherein the queue utilization estimating comprises calculating whether:

$$Qo * \frac{No + Nn}{No} < AI,$$

wherein:
AI is an analysis interval time;
Qo is a current observed queue output utilization;
No is a total observed current packet rate; and
Nn is an estimated packet rate.

13. The method of claim 1 wherein:

$$\frac{Qo * No + Nn < AI}{No},$$

wherein:
Td is a transmission time corresponding to downlink voice frames; and
Tw is the time that voice packets spend waiting at a front of a queue before transmission begins.

14. Logic encoded in one or more tangible media for execution and when executed operable to:
monitor utilization of an access medium relative to one or more access classes;
receive, at an access control point, a Quality of Service (QoS) request, wherein the QoS request identifies an access class;
compute a first allocation of an access medium for the QoS request;
estimate a queue utilization for the QoS request based on the current queue utilization of the access class identified in the QoS request; and
approve the QoS request, if the computed first allocation is less than an amount of the access medium available to the access class identified in the QoS request; wherein approval of the QoS request is further conditioned on the estimated queue utilization not exceeding a queue utilization threshold; and wherein estimating the queue utilization comprises calculating whether:

$$MT <= \min(1 - Pb, Av - RRv - Pv),$$

wherein:
AI is an analysis interval time;
Qo is a current observed queue output utilization;
No is a total observed current packet rate; and
Nn is an estimated packet rate.

15. The logic of claim 14 wherein the available amount of the access medium is based on one or more of an access category reservation, a roaming-in reservation and the observed utilization of the access medium corresponding to the access class identified in the QoS request.

16. The logic of claim 14 wherein the logic is further operable to track, relative to an access point, a percentage of channel busy time and transmission time of downlink frames.

17. The logic of claim 14 wherein the first allocation comprises a number of time slots within a repeating, uniform time interval.

18. The logic of claim 14 wherein the logic is further operable to estimate the queue utilization for the QoS request is based at least in part on the packet rate of the codec corresponding to the QoS request.

19. The logic of claim 18 wherein the packet rate varies with the corresponding codec identified in the QoS request.

20. The logic of claim 14 the logic is further operable to identify, from a plurality of queues, a queue corresponding to the access class identified in the QoS request, and wherein the estimated queue utilization corresponds to the identified queue.

21. The logic of claim 14 wherein the amount of the access medium available to the access class is a configurable parameter.

22. The logic of claim 14 wherein approvals of QoS requests apply independently to individual queues, and wherein each queue can be dedicated to a different access class.

23. The logic of claim 14 wherein access classes comprise one or more of video and voice.

24. Logic encoded in one or more tangible media for execution and when executed operable to:
    monitor utilization of an access medium relative to one or more access classes;
    receive, at an access control point, a Quality of Service (QoS) request, wherein the QoS request identifies an access class;
    compute a first allocation of an access medium for the QoS request; and
    approve the QoS request, if the computed first allocation is less than an amount of the access medium available to the access class identified in the QoS request by calculating whether:

$$MT <= \min(1 - Pb, Av - RRv - Pv),$$

wherein:
    MT is the first allocation of the access medium;
    Pb is a percentage of time that the access medium is busy;
    Av is a percentage of the access medium for voice calls;
    RRv is a percent of the access medium allocated for roaming reserves for voice calls; and
    Pv is an observed utilization of the access medium by voice calls.

25. The logic of claim 24 wherein the logic is further operable to estimate a queue utilization for the QoS request based on the current queue utilization of the access class identified in the QoS request; wherein approval of the QoS request is further conditioned on the estimated queue utilization not exceeding a queue utilization threshold, wherein estimating the queue utilization comprises calculating whether:

$$Qo * \frac{No + Nn}{No} < AI,$$

wherein:
    AI is an analysis interval time;
    Qo is a current observed queue output utilization;
    No is a total observed current packet rate; and
    Nn is an estimated packet rate.

26. The logic of claim 14 wherein:

$$\frac{Qo * No + Nn}{No} < AI,$$

wherein:
    Td is a transmission time corresponding to downlink voice frames; and
    Tw is the time that voice packets spend waiting at a front of a queue before transmission begins.

* * * * *